United States Patent [19]

Kida et al.

[11] Patent Number: 5,026,762

[45] Date of Patent: Jun. 25, 1991

[54] RUBBER COMPOSITION FOR ALL-WEATHER TIRES

[75] Inventors: Masashi Kida, Hiratsuka; Shingo Midorikawa, Ebina; Ichiro Suzuki, Hiratsuka; Yoshihiko Suzuki, Hiratsuka; Youichi Yamaguchi, Hiratsuka, all of Japan

[73] Assignee: The Yokohama Rubber Co., Ltd., Tokyo, Japan

[21] Appl. No.: 519,138

[22] Filed: May 4, 1990

[30] Foreign Application Priority Data

May 25, 1989 [JP] Japan .................................. 1-130158

[51] Int. Cl.⁵ .......................... C08L 7/00; C08L 9/00; C08L 23/16; C08L 61/12
[52] U.S. Cl. ..................................... 524/495; 525/472; 525/236; 525/237; 524/496
[58] Field of Search ................. 524/495, 496; 525/472, 525/236, 237; 152/209 R

[56] References Cited

FOREIGN PATENT DOCUMENTS

| | | |
|---|---|---|
| 53-133248 | 1/1978 | Japan . |
| 55-135149 | 2/1980 | Japan . |
| 58-199203 | 9/1983 | Japan . |
| 59-142236 | 4/1984 | Japan . |
| 60-44538 | 5/1985 | Japan . |
| 60-137945 | 7/1985 | Japan . |
| 63-172750 | 1/1988 | Japan . |

OTHER PUBLICATIONS

Abstract of Japanese Patent 58-152,030, 9/83, Muraki.
Abstract of Japanese Patent 59-74135, 4/84, Muraki.

*Primary Examiner*—Allan M. Lieberman
*Attorney, Agent, or Firm*—Finnegan, Henderson, Farabow, Garrett & Dunner

[57] ABSTRACT

Rubber compositions for tire treads of an all-weather type are disclosed which are so designed as to exhibit high dynamic Young's modulus, sufficient resistance to snow and ice skidding, to abrasion, to cracking and to crack growth and adequate durability. A selected base rubber is combined with a selected carbon black and a selected m-cresol resin. The base rubber is a blend of two different rubbers, one being natural rubber alone or a combination with a diene rubber and the other being butadiene rubber. The carbon black has specified absorptivity of iodine and dibutyl phthalate. The m-cresol resin is a novolak condensate.

7 Claims, No Drawings

RUBBER COMPOSITION FOR ALL-WEATHER TIRES

BACKGROUND OF THE INVENTION

1. Field of the Invention

This invention is directed generally to rubber compositions for automobile tires and has particular reference to such a composition for use in tire treads of an all-weather type.

2. Description of the Prior Art

From the safety viewpoint of automotive vehicles while in running particularly on snowy and icy roads, attempts have been made with a plurality of spikes placed peripherally around a tire tread, or with an anti-skid chain held in surrounding relation to a tire body. Both skidproof means have a drawback in that upon biting into snow and ice during running of the tire, they tend to come into frictional contact with the pavement. This causes dust and dirt in a thawing or dry season, eventually posing hazardous environmental pollution.

In Japanese Patent Laid-Open Publication No. 63-172750 a certain rubber composition has been proposed for use in an attempt to eliminate or alleviate these safety and pollution problems. This prior composition has dispersed, in addition to a matrix rubber, a rubber component of low hardness resulting from vulcanization and subsequent comminution so as to improve abrasion resistance and heat buildup and hence friction force on snow and ice.

Numerous other compositions of the character mentioned are disclosed for instance in Japanese Patent Laid-Open Publication No. 53-133248, No. 55-135149, No. 58-199203, No. 59-142236, No. 60-44538 and No. 60-137945.

In general, studless tires are provided in their tread patterns with a multiplicity of blocks in which small grooves commonly called sipes are disposed substantially in parallel relation to the axis of rotation of the tire, thereby forming extra traction portions and preventing snow and ice skids. Although acceptable in runnability on snow and ice, the foregoing composition of Japanese Publication No. 63-172750 when used in the a tread portion of such studless tire is rather small in hardness and hence poor in durability under dry and wet running conditions. To be more specific, cracking is liable to take place and eventually grow at the bottom of many of the recesses between and among the blocks and also at the bottom of the sipes. On exposure of the tire to a braking force as opposed to a driving force, the tread blocks readily collapse due to shear stresses and become weak. Thus the composition taught by the publication in question has been found to have only a limited utility. Similar considerations apply to the compositions appearing in the other publications.

SUMMARY OF THE INVENTION

The present invention seeks to provide a novel rubber composition for use in tire treads which will exhibit a good balance of qualities from runnability on snow and ice through abrasion resistance and hence durability on dry and wet roads, thus contributing to safe and reliable running over all kinds of weather.

Many other objects and features of the invention will become apparent from the following description.

More specifically, the invention provides a rubber composition for use in tire treads which comprises (a) 100 parts by weight of a base rubber including a first rubber and a second rubber blended in a weight ratio of from 50:50 to 75:25, the first rubber containing natural rubber in an amount of at least 80% by weight, and the second rubber consisting essentially of butadiene rubber, (b) 55 to 90 parts by weight of a carbon black having an iodine adsorption of from 90 to 200 ml/g and a dibutyl phthalate adsorption of from 100 to 140 ml/100 g and (c) 1 to 10 parts by weight of an m-cresol resin whereby the composition has a dynamic Young's modulus of not less than 8 MPa at 0° C.

DETAILED DESCRIPTION OF THE INVENTION

The rubber compositions of the present invention, which was designed particularly for use in tire treads, are comprised essentially of a base rubber, a carbon black and a cresol resin, each of these three components being specifically described later. Importantly, the composition should be so constituted as to have a dynamic Young's modulus of 8 MPa at 0° C. as defined in a manner to be mentioned, which modulus is associated closely with abrasion resistance of the ultimate tread.

Base rubbers eligible for purposes of the invention are a blend of two different rubbers. One or a first rubber may be chosen from natural rubber (NR) and combinations of NR with diene rubbers. The other or second rubber is a butadiene rubber (BR) with its content of the cis 1,4-bond varying for example from 35 to 98%.

The first and second rubbers should be blended in a weight ratio of 50:50 to 75:25. More than 50% of the second rubber or BR in the base rubber would fail to increase the Young's modulus to an acceptable level, meaning that the resultant tread would become severely abrasive during running on dry and wet roads. Below 25% of BR would render the final tread susceptible to cracks and their growth at the bottom of the block recesses and at the bottom of the sipes or grooves.

Turning again to the first rubber, the use of NR alone is particularly preferred in an embodiment of the invention. Where an NR-diene rubber combination is found desirable, NR should be used in a major proportion of 80% by weight or greater. Less NR rubber, hence more diene rubber, would produce a rubber composition of unacceptable quality for tread formation. Specific examples of diene rubbers include polyisoprene rubber (IR), styrene-butadiene rubber (SB), ethylene-propylene-diene rubber (EPDM) and the like.

Carbon blacks used herein are those structured to have an iodine adsorption of 90 to 200 mg/g and a dibutyl phthalate adsorption of 100 to 140 ml/100 g, each such adsorption being as determined by the JIS K-6221 method. If the carbon black is less adsorptive to iodine it would be ineffective in improving abrasion resistance and if it is more absorptive, it would make the final rubber mix less resistant to snow and ice skids. Lower adsorption of dibutyl phthalate would also be responsible for lower abrasion resistance, whereas higher adsorption would show no appreciable improvement in prevention propagnation of accidental cracks.

The carbon black according to the invention is commercially available with strict selectivity.

The carbon black should be added in the range of 55 to 90 parts by weight per 100 parts by weight of the base rubber. Smaller amounts would not be effective in achieving an improved Young's modulus, and larger amounts would present the difficulty of it not being uniformly dispersed in the finished rubber mix, entailing increased generation of heat and hence reduced resistance to crack.

Another key factor in the invention resides in the use of a cresol resin combined with the base rubber and the carbon black specified above. Suitable cresol resins are typified by an m-cresol resin of a novolak type condensate derived by reacting m-cresol with p-formaldehyde in the presence of an acid catalyst. The condensate has an m-cresol unit in number of from 2 to 6 and softens at from 80° to 120° C. A suitable m-cresol resin is manufactured by Sumitomo Chemical Co. and sold under the trademark Sumikanol 610. The m-cresol resin compensates for crack growth which would depend upon the nature of carbon blacks used and further to enhance resistance to ice skid.

The m-cresol resin should range in amount from 1 to 10 parts by weight, preferably from 2 to 6 parts by weight, per 100 parts by weight of the base rubber. Less than 1 part would lead to objectionable snow and ice skids and even to inadequate crack growth on dry and wet roads. More than 10 parts would result in a rubber mix of excessive hardness and severe brittleness.

Various other additives may if necessary be employed in conventional fashion which are selected from vulcanizing agents such for example as sulfur, vulcanizing accelerators, vulcanizing activators, antioxidants, oils, zinc oxide, stearic acid and the like.

The invention will be further described by way of the following examples which are provided for purposes of illustration.

Different rubber compositions were prepared as tabulated, all the formulations being denoted in part by weight. For brevity "E" stands for "Example" and "CE" for "Comparative Example".

Defined below are certain components used to prepare the test compositions.

(1) Butadiene Rubber 1 (BR-1)
    Nipol 1220, Nippon Zeon Co.
    cis 1,4-bond 98%
(2) Butadiene Rubber 2 (BR-2)
    Diene 35, Asahi Chemical Industry Co.
    cis 1,4-bond 35%
(3) Styrene-Butadiene Rubber
    Nipol 1502, Nippon Zeon Co.
(4) carbon black (N220)
    iodine adsorption 121 mg/g
    dibutyl phthalate adsorption 114 ml/100 g
(5) carbon black (N330)
    iodine adsorption 82 mg/g
    dibutyl phthalate adsorption 102 ml/100 g
(6) m-cresol resin
    Sumikanol 610, Sumitomo Chemical Co.
(7) antioxidant
    N-(1,3-dimethyl)-N'-phenyl-p-phenylenediamine
(8) accelerator
    N-t-butyl-2-benzothiazolsulfenamide In each run all the components except for sulfur and accelerator were mixed in a Banbury mixer to thereby provide a master batch to which those two additives were thereafter added by means of an open roll. The finished composition was vulcanized in a known manner. Performance evaluation of the vulcanizate was made with respect to dynamic Young's modulus, ice skid resistance, abrasion resistance and crack growth resistance. Testing was conducted under the conditions given below and with the results tabulated along with the formulations.

Dynamic Young's Modulus

Measurement was made with a 20 mm long, 5 mm wide, 2 mm thick specimen on a viscoelasticity spectrometer (Toyo Seiki Seisakusho Co.). The conditions were at a frequency of 20 Hz, an initial strain of 10%, a dynamic strain of ±2% and a temperature of 20° C.

Ice Skid Resistance

ASTM B-303-74 was followed with a British portable skid tester. Used were a 25 mm × 10 mm × 15 mm specimen and a −5° C. ice plate. To facilitate comparison, the result obtained from Comparative Example 1 was taken as an index of 100. The greater the index, the higher resistance to ice skid.

Abrasion Resistance

A disc-like specimen of 60 mm in diameter and 10 mm in thickness was formed from the vulcanizate, followed by pressing at a slip ratio of 25% against a rotating drum for a predetermined duration on a Lambourn abrasion tester. A wear was counted from the weight loss. Comparison was made as above. The larger index, the less wear.

Crack Growth Resistance

A 150 mm × 20 mm × 2 mm strip-like specimen was cut to a depth of 1 mm and then subjected to dynamic fatigue at a strain of 20% with the use of a de Mattia flexing tester. This quality was adjudged by the speed required for the specimen to sever. A criterion of comparison was as set above. The larger index, the lesser crack growth.

In Comparative Example 1 the blend ratio of natural rubber NL and butadiene rubber (BR-1) was outside the scope of the invention. Example 1, in contrast to that control, excels particularly in resistance to ice skid and to crack growth. Example 2 differs from Example 1 only in the 1,4-bond content of butadiene rubber (BR-2), demonstrating similar superior qualities. This is interpreted to mean that BR may be chosen in rather an optional manner.

Less carbon black N220 was unacceptable in dynamic Young's modulus and abrasion resistance as is evident from Comparative Example 2. As appears clear from Example 3 the use of relatively large amounts of carbon black and also of oil proved to improve resistance to abrasion, to ice skid and to crack growth.

Comparative Example 3 revealed that lower adsorptions of both iodine and dibutyl phthalate, carbon black N330, cause abrasion and crack growth.

Freedom from m-cresol resin, Comparative Example 4, led to a sharp decline in dynamic Young's modulus and in ice skid resistance. Even a small amount of such resin as in Example 4 is capable of exhibiting, though slightly lower in Young's modulus than in Comparative Example 1, sufficient abrasion resistance and notably high resistance to crack growth and to ice skid. Half a proportion of m-cresol resin as against Example 4 is also acceptable without appreciable decline in quality as is apparent from Example 7.

A rubber mix abundant in m-cresol resin, Example 5, is conspicuously high in respect of Young's modulus and crack growth resistance. A lot of the resin has been found significant, as evidenced by Example 8, in improving ice skid- and crack growth-proofness.

An NR/SBR-BR system is represented in Example 6 in which all the test properties are well balanced. Lesser NR, hence excess diene rubber, should be avoided to preclude quality deterioration as seen from Comparative Example 5.

| run | CE 1 | E 1 | E 2 | CE 2 | CE 3 | E 3 | CE 4 | E 4 | E 5 | E 6 | CE 5 | E 7 | E 8 |
|---|---|---|---|---|---|---|---|---|---|---|---|---|---|
| NR | 80 | 60 | 60 | 60 | 60 | 60 | 60 | 60 | 60 | 50 | 30 | 60 | 60 |
| BR-1(1) | 20 | 40 | — | 40 | 40 | 40 | 40 | 40 | 40 | 40 | 40 | 40 | 40 |
| BR-2(2) | — | — | 40 | — | — | — | — | — | — | — | — | — | — |
| SBR(3) | — | — | — | — | — | — | — | — | 10 | 30 | — | — | |
| carbon black (N220)(4) | 60 | 60 | 60 | 50 | — | 70 | 60 | 60 | 60 | 60 | 60 | 60 | 60 |
| carbon black (N330)(5) | — | — | — | — | 60 | — | — | — | — | — | — | — | — |
| aromatic oil | 6 | 6 | 6 | 6 | 6 | 36 | 6 | 6 | 6 | 6 | 6 | 6 | 6 |
| m-cresol resin(6) | 3 | 3 | 3 | 3 | 3 | 3 | 0 | 2 | 5 | 3 | 3 | 1 | 8 |
| zinc oxide | 4 | 4 | 4 | 4 | 4 | 4 | 4 | 4 | 4 | 4 | 4 | 4 | 4 |
| stearic acid | 2 | 2 | 2 | 2 | 2 | 2 | 2 | 2 | 2 | 2 | 2 | 2 | 2 |
| antioxidant(7) | 2 | 2 | 2 | 2 | 2 | 2 | 2 | 2 | 2 | 2 | 2 | 2 | 2 |
| sulfur | 2 | 2 | 2 | 2 | 2 | 2 | 2 | 2 | 2 | 2 | 2 | 2 | 2 |
| accelerator(8) | 1 | 1 | 1 | 1 | 1 | 1 | 1 | 1 | 1 | 1 | 1 | 1 | 1 |
| dyamic Young's modulus | 9.75 | 9.43 | 9.37 | 6.82 | 9.00 | 9.99 | 7.74 | 9.07 | 10.15 | 9.50 | 9.56 | 8.41 | 11.08 |
| ice skid resistance | 100 | 124 | 122 | 116 | 113 | 125 | 88 | 119 | 134 | 121 | 109 | 110 | 142 |
| abrasion resistance | 100 | 116 | 112 | 99 | 75 | 121 | 124 | 119 | 111 | 110 | 98 | 129 | 107 |
| crack growth resistance | 100 | 152 | 144 | 175 | 91 | 126 | 112 | 147 | 162 | 129 | 95 | 128 | 143 |

What is claimed is:

1. A rubber composition for use in tire treads which comprises:
   (a) 100 parts by weight of a base rubber comprising a first rubber and a second rubber blended in a weight ratio of from 50:50 to 72:25, said first rubber containing natural rubber in an amount of at least 80% by weight, and said second rubber consisting essentially of a butadiene rubber;
   (b) from 55 to 90 parts by weight of a carbon black having an iodine adsorption of from 90 to 200 mg/g and a dibutyl phthalate adsorption of from 100 to 140 ml/100 g; and
   (c) from 1 to 10 parts by weight of a novolak-type m-cresol-formaldehyde resin said composition having a dynamic Young's modulus of not less than 8 MPa at 0° C.

2. The rubber composition of claim 1 wherein said first rubber consists essentially of natural rubber.

3. The rubber composition of claim 1 wherein said first rubber consists essentially of a combination of at least 80% natural rubber and the balance a diene rubber.

4. The rubber composition of claim 3 wherein said diene rubber is selected from the group consisting of polyisoprene rubber, styrene-butadiene rubber and ethylene-propylene-diene rubber.

5. The rubber composition of claim 1 wherein said butadiene rubber has a cis 1,4-bond content of from 35 to 98%.

6. The rubber composition of claim 1 including from 2 to 6 parts by weight of the m-cresol-formaldehyde resin.

7. The rubber composition of claim 1 wherein said resin had from 2 to 6 m-cresol units.

* * * * *

UNITED STATES PATENT AND TRADEMARK OFFICE
CERTIFICATE OF CORRECTION

PATENT NO. : 5,026,762
DATED : June 25, 1991
INVENTOR(S) : Masashi KIDA et al.

It is certified that error appears in the above-identified patent and that said Letters Patent is hereby corrected as shown below:

On the title page:

Delete the abstract in its entirety and insert therefor:

--Rubber compositions for tire treads of an all-weather type having a high dynamic Young's modulus, sufficient resistance to snow and ice skidding, to abrasion, to cracking and to crack growth and adequate durability. The composition comprises a base rubber consisting of a blend of two different rubbers, one being natural rubber alone or with a diene rubber and the other a butadiene rubber; carbon black of specified adsorptivity of iodine and dibutyl phthalate and a m-cresol formaldehyde resin condensate.--

Signed and Sealed this

Nineteenth Day of January, 1993

*Attest:*

DOUGLAS B. COMER

*Attesting Officer*   *Acting Commissioner of Patents and Trademarks*